United States Patent
James et al.

(10) Patent No.: US 8,788,271 B2
(45) Date of Patent: *Jul. 22, 2014

(54) CONTROLLING USER INTERFACES WITH CONTEXTUAL VOICE COMMANDS

(75) Inventors: Frances James, Sunnyvale, CA (US); Rama Gurram, San Jose, CA (US)

(73) Assignee: SAP Aktiengesellschaft, Walldorf (DE)

( * ) Notice: Subject to any disclaimer, the term of this patent is extended or adjusted under 35 U.S.C. 154(b) by 2263 days.

This patent is subject to a terminal disclaimer.

(21) Appl. No.: 11/020,756

(22) Filed: Dec. 22, 2004

(65) Prior Publication Data

US 2006/0136221 A1   Jun. 22, 2006

(51) Int. Cl.
| | |
|---|---|
| G10L 21/00 | (2013.01) |
| G10L 25/00 | (2013.01) |
| G06F 9/44 | (2006.01) |
| G10L 15/26 | (2006.01) |

(52) U.S. Cl.
CPC ............ *G10L 15/265* (2013.01); *G06F 9/4443* (2013.01)
USPC .......................................... 704/275; 704/270

(58) Field of Classification Search
USPC ................................. 704/275, 270
See application file for complete search history.

(56) References Cited

U.S. PATENT DOCUMENTS

| | | | |
|---|---|---|---|
| 4,509,133 | A | 4/1985 | Monbaron et al. |
| 4,783,803 | A | 11/1988 | Baker et al. |
| 4,829,576 | A | 5/1989 | Porter |
| 5,289,375 | A | 2/1994 | Fukumochi et al. |
| 5,377,303 | A | 12/1994 | Firman |
| 5,619,708 | A | 4/1997 | Ho |
| 5,799,279 | A | 8/1998 | Gould et al. |
| 5,805,775 | A | 9/1998 | Eberman et al. |
| 5,812,977 | A | 9/1998 | Douglas |
| 5,828,991 | A | 10/1998 | Skiena et al. |
| 5,884,262 | A | 3/1999 | Wise et al. |
| 5,893,063 | A | 4/1999 | Loats et al. |
| 5,991,719 | A | 11/1999 | Yazaki et al. |
| 6,012,030 | A | 1/2000 | French-St. George et al. |

(Continued)

FOREIGN PATENT DOCUMENTS

| | | |
|---|---|---|
| EP | 0 878948 | 11/1998 |
| JP | 2002-023996 | 1/2002 |

OTHER PUBLICATIONS

Accessibility™, "Windows 98® Accessibility Features and Functions," Microsoft® TechNet, Knowledge Base Appendix H, © 1998.

(Continued)

*Primary Examiner* — Richemond Dorvil
*Assistant Examiner* — Michael Ortiz Sanchez
(74) *Attorney, Agent, or Firm* — Fish & Richardson P.C.

(57) ABSTRACT

One or more voice-enabled user interfaces include a user interface, and a voice extension module associated with the user interface. The voice extension module is configured to voice-enable the user interface and includes a speech recognition engine, a preprocessor, and an input handler. The preprocessor registers with the speech recognition engine one or more voice commands for signaling for execution of one or more semantic operations that may be performed using a first user interface. The input handler receives a first voice command and communicates with the preprocessor to execute a semantic operation that is indicated by the first voice command. The first voice command is one of the voice commands registered with the speech recognition engine by the preprocessor.

20 Claims, 10 Drawing Sheets

(56) References Cited

U.S. PATENT DOCUMENTS

| | | | |
|---|---|---|---|
| 6,108,629 A | 8/2000 | Kasday | |
| 6,125,376 A | 9/2000 | Klarlund et al. | |
| 6,175,820 B1 | 1/2001 | Dietz | |
| 6,192,343 B1 | 2/2001 | Morgan et al. | |
| 6,434,524 B1 | 8/2002 | Weber | |
| 6,456,974 B1* | 9/2002 | Baker et al. | 704/270.1 |
| 6,766,298 B1* | 7/2004 | Ravishankar et al. | 704/270.1 |
| 6,816,837 B1* | 11/2004 | Davis | 704/275 |
| 7,020,841 B2* | 3/2006 | Dantzig et al. | 715/727 |
| 7,036,080 B1* | 4/2006 | James et al. | 715/728 |
| 7,149,694 B1* | 12/2006 | Harb et al. | 704/270.1 |
| 7,260,535 B2* | 8/2007 | Galanes et al. | 704/270 |
| 7,324,947 B2* | 1/2008 | Jordan et al. | 704/275 |
| 7,383,189 B2* | 6/2008 | Halonen et al. | 704/275 |
| 2001/0043234 A1 | 11/2001 | Kotamarti | |
| 2002/0077823 A1* | 6/2002 | Fox et al. | 704/260 |
| 2003/0004728 A1* | 1/2003 | Keiller | 704/275 |
| 2003/0079051 A1 | 4/2003 | Moses et al. | |
| 2003/0125956 A1 | 7/2003 | Lewis et al. | |
| 2003/0156130 A1* | 8/2003 | James et al. | 345/728 |
| 2003/0171928 A1* | 9/2003 | Falcon et al. | 704/275 |
| 2003/0208352 A1 | 11/2003 | Lee | |
| 2004/0019476 A1* | 1/2004 | Glynn | 704/1 |
| 2004/0107108 A1* | 6/2004 | Rohwer | 704/275 |
| 2004/0128136 A1 | 7/2004 | Irani | |
| 2004/0138891 A1 | 7/2004 | Vora | |
| 2004/0236580 A1* | 11/2004 | Bennett | 704/270.1 |
| 2005/0027538 A1* | 2/2005 | Halonen et al. | 704/275 |
| 2005/0137878 A1* | 6/2005 | Roth et al. | 704/275 |
| 2006/0064302 A1* | 3/2006 | Ativanichayaphong et al. | 704/235 |

OTHER PUBLICATIONS

Conversā™, "Surf the Web with Your Voice," Product Packaging © 1998.

Dragon Naturally Speaking (DNS) Voice Recognition Version 8.0, [online]. [Retrieved on Feb. 16, 2005]. Retrieved from the Internet: <URL: http://www.dragontalk.com/NATURAL.htm>.

Edwards, W. Keith, et al., "An Architecture for Transforming Graphical Interfaces," *Proceedings of the 7th Annual ACM Symposium on User Interface Software and Technology*, Nov. 1994, pp. 39-47.

Higgins, Dennis, et al., "Speech-Enabled SQL Database Applications Using Java," *The Journal of Computing in Small Colleges*, vol. 16 (3), Mar. 2001, pp. 26-38.

Huang, Chung-Ming, et al., "Surfing the Web Using a Telephone Set," *Proceedings of the 26th EUROMICRO Conference (EUROMICRO'00)*, The Netherlands, Sep. 5-7, 2000, vol. 2, pp. 126-133.

James, Frankie, et al., "Voice Over Workplace (VoWP): Voice Navigation in a Complex Business GUI," *Proceedings of the 5th International ACM Conference on Assistive Technologies (Assets 2002)*, Jul. 8-10, 2002, pp. 197-204.

JustVoice™: Voice Recognition for Microsoft® Windows 3.1, User's Guide and Installation Guide with Update Notice 2.2.1, Interactive Products Inc., © 1994.

JustVoice™: Voice Recognition for MS Windows 95, User's Guide and Installation Guide, Interactive Products Inc.

Narayanaswami, Anand, et al., "An Online Prototype Speech-Enabled Information Access Tool Using Java Speech Application Programming Interface," *Proceedings of the 33rd Southeastern Symposium on System Theory*, Mar. 2001, pp. 111-115.

Noon, Bill, 'ListenUp! Speech Recognition PlugIn for Netscape 2.0' [online]. [retrieved on Feb. 18, 2005]. Retrieved from the Internet: <URL: http://snow.cit.cornell.edu/noon/ListenUp.html>.

"Plato™ HouseLinc SmartLinc," online screen excerpts, Tom Gillespie, © 1997.

Speech Synthesis Markup Language (SSML) Version 1.0, Ch. 1 (pp. 1-11, 42), [online]. W3C, Sep. 7, 2004, [retrieved on Feb. 16, 2005]. Retrieved from the Internet: <URL: http://www.w3.org/TR/speech-synthesis/>.

ViaVoice Product Overview, [online]. IBM, [retrieved on Feb. 16, 2005]. Retrieved from the Internet: <URL: http://www-306.ibm.com/software/voice/viavoice/>.

VoiceAssist™ User's Guide, Creative Labs Inc., © 1993.

White, Jim, "Voice Browsing," *IEEE Internet Computing*, Jan./Feb. 2000, pp. 55-56.

Lernout and Houspie, "Dragon Naturally Speaking 5," Dragon Naturally Speaking User's Guide, Oct. 2000, pp. 1-131.

Foley et al., "Computer Graphics, Principles and Practice," Addison-Wesley, Reading, US, 1996, pp. 1-49.

James and Roelands, "Voice over Workplace (VoWP): Voice Navigation in a Complex Business GUI," Proceedings of the fifth international ACM conference on Assistive technologies, Edinburgh, Scotland, 2002, ACM Press, NY, NY, pp. 197-204.

'Using small screen space more efficiently' [online]. Kamba et al., 1996, [retrieved on Jan. 16, 2007]. Retrieved from the Internet: <URL: http://delivery.acm.org/10.1145/240000/238582/p383-kamba.pdf?key1=238582&key2=1123698611&coll=portal&dl=ACM&CFID=11586080&CFTOKEN=77013129>, 8 pages.

Core Java Internationalization [online]. Sun Microsystems, Inc., undated materials, [retrieved on Dec. 22, 2004]. Retrieved from the Internet : <URL: http://java.sun.com/j2se/corejava/intl/index.jsp>.

Voice Extensible Markup Language (VoiceXML) Version 2.0, Ch. 1 (pp. 1-28), [online]. W3C, Mar. 16, 2004, [retrieved on Dec. 22, 2004]. Retrieved from the Internet: <URL: http://www.w3.org/TR/voicexml20/>.

\* cited by examiner

CONTROLLING USER INTERFACES WITH CONTEXTUAL VOICE COMMANDS

CROSS REFERENCE TO RELATED APPLICATIONS

This application is being filed concurrently with U.S. application Ser. No. 11/017,889, titled "Controlling User Interfaces with Voice Commands from Multiple Languages".

TECHNICAL FIELD

This document relates to voice controlled user interfaces.

BACKGROUND

Much of software used in business today takes the form of complex graphical user interfaces (GUIs). Complex GUIs allow users to perform many tasks simultaneously while maintaining the context of the rest of their work; however, such systems are often mouse- and keyboard-intensive, which can be problematic or even impossible to use for many people, including those with physical disabilities. Voice interfaces can provide an accessible solution for physically disabled users if steps are taken to address inherent usability problems, such as user efficiency and ambiguity handling. Additionally, voice interfaces may increase the efficiency of performing certain tasks.

Large resources have been expended to develop web-based applications to provide portable, platform-independent front ends to complex business applications using, for example, the hypertext markup language (HTML) and/or JavaScript. Because software applications have typically been developed with only the visual presentation in mind, little attention has been given to details that would facilitate the development of voice interfaces.

In most computer or data processing systems, user interaction is provided using only a video display, a keyboard, and a mouse. Additional input and output peripherals are sometimes used, such as printers, plotters, light pens, touch screens, and bar code scanners; however, the vast majority of computer interaction occurs with only the video display, keyboard, and mouse. Thus, primary human-computer interaction is provided through visual display and mechanical actuation. In contrast, a significant proportion of human interaction is verbal. Various technologies have been developed to provide some form of verbal human-computer interactions, ranging from simple text-to-speech voice synthesis applications to more complex dictation and command-and-control applications. It is desirable to further facilitate verbal human-computer interaction to increase access for disabled users and to increase the efficiency of user interfaces.

SUMMARY

In one general aspect, a voice-enabled user interface includes a first user interface, and a voice extension module. The voice extension module is associated with the first user interface and is configured to voice-enable the user interface. The voice extension module includes a speech recognition engine, a preprocessor, and an input handler. The preprocessor registers with the speech recognition engine one or more voice commands for signaling for execution of one or more semantic operations that may be performed using the first user interface. The input handler receives a first voice command and communicates with the preprocessor to execute a semantic operation that is indicated by the first voice command. The first voice command is one of the voice commands registered with the speech recognition engine by the preprocessor.

Implementations may include one or more of the following features. For example, the preprocessor may register with the speech recognition engine one or more additional voice commands for switching to a second user interface. The input handler may receive a second voice command and may communicate with the preprocessor to switch to the second user interface. The second voice command may be one of the additional voice commands registered with the speech recognition engine by the preprocessor.

The voice-enabled user interface may include a second user interface. The preprocessor may register with the speech recognition engine one or more additional voice commands for signaling for execution of one or more semantic operations that may be performed using the second user interface. The input handler may receive a second voice command and may communicate with the preprocessor to execute a semantic operation that is indicated by the second voice command. The second voice command may be one of the additional voice commands registered with the speech recognition engine by the preprocessor.

The preprocessor may register with the speech recognition engine one or more additional voice commands for controlling one or more graphical elements of the first user interface. The input handler may receive a second voice command and may communicate with the preprocessor to control a graphical element of the first user interface that is indicated by the second voice command. The second voice command may be one of the additional voice commands registered with the speech recognition engine by the preprocessor.

The input handler may prompt for additional information that further specifies the semantic operation that is executed in response to the first voice command.

The preprocessor may include a generator and a translator. The generator may be configured to identify one or more semantic operations that may be performed with the user interface. The translator may be configured to register with the speech recognition engine one or more voice commands for signaling for execution of the one or more identified semantic operations.

The user interface may be a hypertext markup language (HTML) document presented in a web browser, or a standalone application. The user interface may be a user interface for a web services application.

In another general aspect, a voice extension module for voice-enabling a user interface includes a speech recognition engine, a preprocessor, and an input handler. The preprocessor registers with the speech recognition engine one or more voice commands for signaling for execution of one or more semantic operations that may be performed using a user interface. The input handler receives a first voice command and communicates with the preprocessor to execute a semantic operation that is indicated by the first voice command using the user interface. The first voice command is one of the voice commands registered with the speech recognition engine by the preprocessor.

Implementations may include one or more of the following features. For example, the preprocessor may register with the speech recognition engine one or more additional voice commands for switching to a second user interface. The input handler may receive a second voice command and may communicate with the preprocessor to switch to the second user interface. The second voice command may be one of the additional voice commands registered with the speech recognition engine by the preprocessor.

The preprocessor may register with the speech recognition engine one or more additional voice commands for signaling for execution of one or more semantic operations that may be performed using a second user interface. The input handler may receive a second voice command and may communicate with the preprocessor to execute a semantic operation that is indicated by the second voice command. The second voice command may be one of the additional voice commands registered with the speech recognition engine by the preprocessor.

The preprocessor may register with the speech recognition engine one or more additional voice commands for controlling one or more graphical elements of the first user interface. The input handler may receive a second voice command and may communicate with the preprocessor to control a graphical element of the first user interface that is indicated by the second voice command. The second voice command may be one of the additional voice commands registered with the speech recognition engine by the preprocessor.

The input handler may prompt for additional information that further specifies the semantic operation that is performed in response to the first voice command.

The preprocessor may include a generator and a translator. The generator may be configured to identify one or more semantic operations that may be performed with the user interface. The translator may be configured to register with the speech recognition engine one or more voice commands for signaling for execution of the one or more identified semantic operations.

In another general aspect, enabling a user interface to be controlled with voice commands includes accessing information describing a first user interface that enables interaction with a first application. One or more semantic operations that may be performed with the first user interface are identified. One or more voice commands are registered with a speech recognition engine to enable voice control of the first user interface. Each voice command corresponds to one of the semantic operations. One of the semantic operations is performed in response to a first voice command. The first voice command is one of the voice commands registered with the speech recognition engine, and the performed semantic operation corresponds to the first voice command.

Implementations may include one or more of the following features. For example, one or more additional voice commands may be registered with a speech recognition engine to enable switching to a second user interface of a second application. Each additional voice command may correspond to a switch to the second user interface. In response to a second voice command that is one of the additional voice commands registered with the speech recognition engine and that corresponds to a switch to the second application, the switch to the second user interface corresponding to the second voice command may be performed.

One or more additional voice commands may be registered with a speech recognition engine to enable voice control of a second user interface. Each additional voice command may correspond to a semantic operation that may be performed with the second user interface. One of the semantic operations may be performed in response to a second voice command. The second voice command may be one of the additional voice commands registered with the speech recognition engine. The performed semantic operation may correspond to the second voice command.

One or more graphical elements of the first user interface that may be controlled may be identified. One or more additional voice commands may be registered with a speech recognition engine to enable control of the identified graphical elements of the first user interface. Each additional voice command may correspond to at least one of the identified graphical elements. One of the identified graphical elements may be controlled in response to a second voice command. The second voice command may be one of the additional voice commands registered with the speech recognition engine. The controlled graphical element may correspond to the second voice command.

A prompt for additional information that further specifies the semantic operation that is performed in response to the first voice command may be issued. The first voice command may be clarified such that the first voice command corresponds only to the semantic operation that is performed in response to the first voice command. Feedback indicating that semantic operation indicated by the first voice command has been performed may be provided.

These general and specific aspects may be implemented using a system, a method, or a computer program, or a combination of systems, methods, and computer programs. Other features will be apparent from the description and drawings, and from the claims.

DETAILED DESCRIPTION

In one or more implementations, a user interface to a software application or an electronic device is voice-enabled to facilitate interaction with the user interface. A user may signal for execution of a semantic operation provided by the user interface with a single voice command. A semantic operation is an operation that includes multiple smaller sub-operations, each of which may generally be executed with conventional interaction with the user interface, such as generating user input with a keyboard and a mouse. Thus, execution of a semantic operation generally requires multiple interactions and inputs. The user interface to the software application is voice-enabled without modifying the application to enable voice control of the application. More particularly, a voice extension module is used to enable voice commands to be used to signal for execution of semantic operations supported by the user interface and the software application.

In particular implementations, enabling a user to execute a semantic operation by issuing a single voice command enables the user to interact with the user interface efficiently, because the user is not required to execute individually each of the sub-operations associated with the semantic operation. Furthermore, enabling such interaction with the user interface enables the user to interact more naturally with the user interface. More particularly, the voice command may be a more natural instruction or description for the semantic operation, rather than a more technical voice command that references one or more graphical elements of the user interface. As a result, the user interface has a greater usability and accessibility than other user interfaces that are not voice-enabled, particularly for physically disabled users and other users that may have difficulty generating manual input.

The voice extension module may obviate the need to modify an application in order to support voice commands for semantic operations. As a result, existing applications may be provided with a voice extension module to voice-enable the existing applications such that semantic operations supported by the existing applications may be executed in response to a single voice command.

Figure 1A:
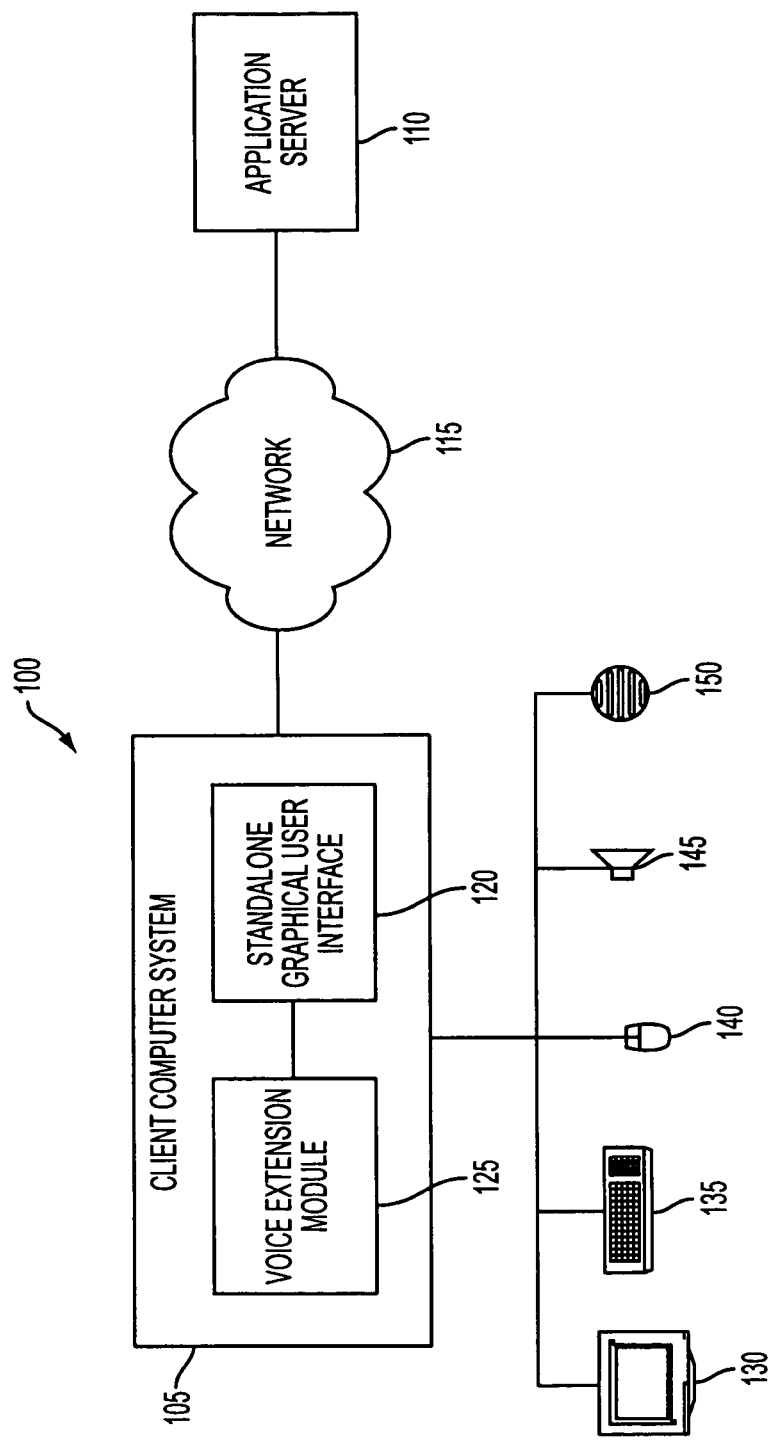
FIGS. 1A and 1B are block diagrams of voice-enabled computer applications that use a voice extension module.
Figure 1B:
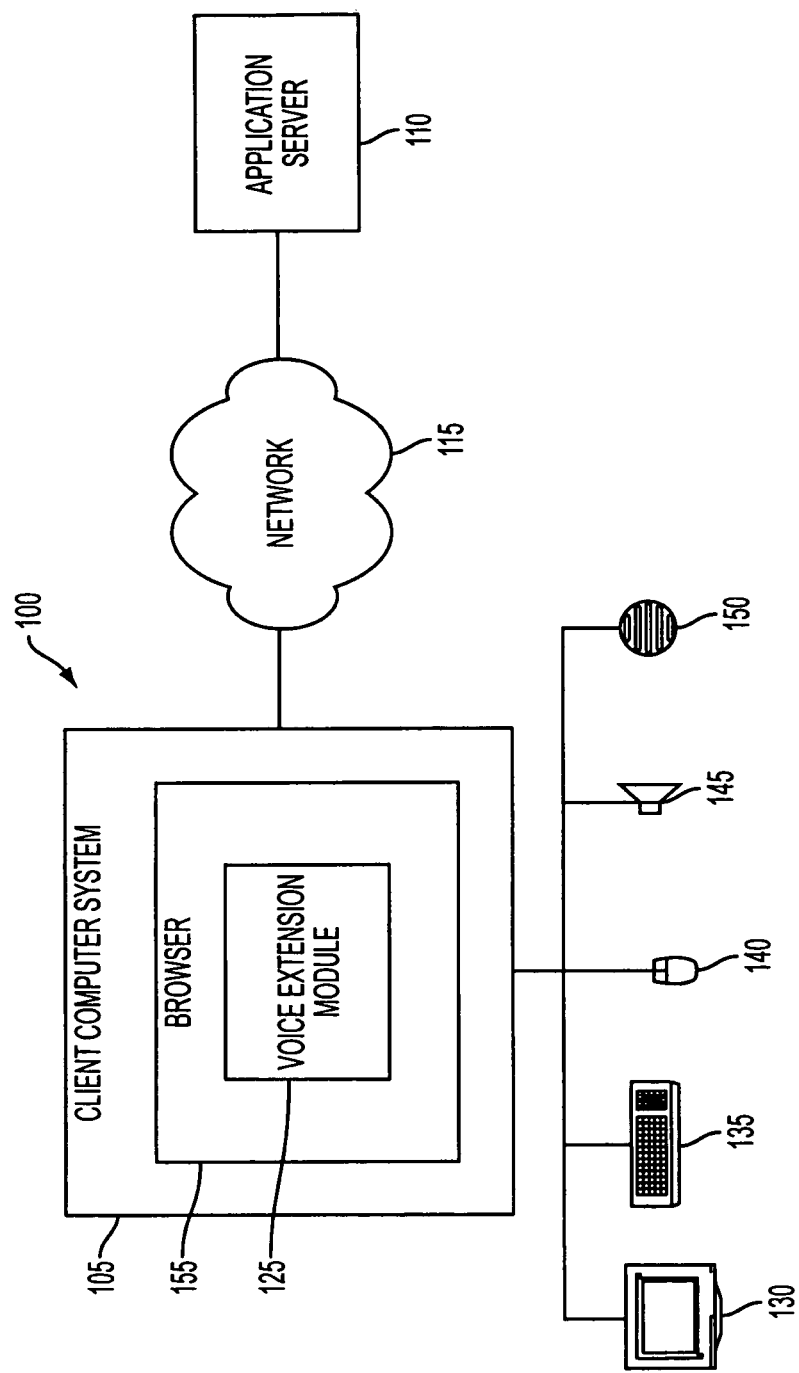

Referring to FIG. 1A, a first implementation of a voice-enabled computer interface 100 includes a client computer system 105 that enables a user to interact with an application provided by an application server 110 over a network 115. The client computer system 115 includes a standalone graphical user interface (GUI) 120 for the application, and the graphical user interface 120 communicates with a voice extension module 125. The GUI 120 enables user interaction with the application using one or more of a video display monitor 130, a keyboard 135, a mouse 140 and a speaker 145. The voice extension module 125 may receive input from a microphone 150. Referring also to FIG. 1B, a second implementation of a voice-enabled computer interface 100 includes a web browser 155 instead of the graphical user interface 120 to present a web-based user interface for the application provided by the application server 110. In such an implementation, the voice extension module 125 is included in the browser 155.

The client computer system 105 is a computer system used by a user to access and interact with an application provided by the application server 110. The client computer system 105 provides a user interface to the application that enables the user to access and interact with the application. More particularly, the client computer system 105 presents output from the application and the user interface to the user, and receives input for the application and the user interface from the user. The client computer system 105 also communicates with the application server 110 to enable the user of the client computer system 105 to monitor and control execution of the application.

The application server 110 is a computer system on which the application is executed. The application server 110 also provides access to the application to the client computer system 105. For example, the application server 110 may provide information specifying a user interface for the application to the client computer system 105. The application server 110 also may provide information to be presented to the user on the user interface to the client computer system 105. The application server 110 also may receive input generated by the user of the client computer system 105, and the received input may be used to control execution of the application.

The network 115 is a network that connects the client computer system 105 to the application server 110. For example, the network 115 may be the Internet, the World Wide Web, one or more wide area networks (WANs), one or more local area networks (LANs), analog or digital wired and wireless telephone networks (e.g. a public switched telephone network (PSTN), an integrated services digital network (ISDN), or a digital subscriber line (xDSL)), radio, television, cable, satellite, and/or any other delivery mechanism for carrying data. The client computer system 105 and the application server 110 are connected to the network 115 through communications pathways that enable communications through the network 115. Each of the communication pathways may include, for example, a wired, wireless, cable or satellite communication pathway, such as a modem connected to a telephone line or a direct internetwork connection. The client computer system 105 and the application server 110 may use serial line internet protocol (SLIP), point-to-point protocol (PPP), or transmission control protocol/internet protocol (TCP/IP) to communicate with one another over the network 115 through the communications pathways.

The GUI 120 is a standalone application that may be used to access the application executing on the application server 110. More particularly, the client computer system 105 executes the GUI 120 to enable a user to monitor and control the application. The GUI 120 may present information describing the operation of the application to the user. The GUI 120 also may enable the user to provide input that may be used to control application. For example, the user may be enabled to specify parameters or data needed by the application with the GUI 120. The GUI 120 also may include metadata describing functions provided by the GUI 120. Because the GUI 120 is a standalone application, the user interface provided by the GUI 120 is not presented within another application program executing on the client computer system 105, such as a browser.

The browser 155 is configured to receive a web-based user interface to an application specified from the application server 110 over the network 115. The web-based user interface may be specified as Hypertext Markup Language (HTML) code or JavaScript code. The HTML code instructs the browser 155 to display information and accept user input and commands. The HTML code describes various text, images, and user interface elements to be displayed to the user. The browser 155 also may receive metadata describing functions that are provided by the user interface from the application server 110. The browser 155 may be a conventional web browser, such as Internet Explorer, which is provided by Microsoft Corporation of Redmond, Wash.

In the implementation of the voice-enabled computer interface 100 illustrated in FIG. 1A, the voice extension module 125 is a standalone application in communication with the GUI 120. In another implementation of the voice-enabled computer interface 100, the voice extension module 125 may be a module within the GUI 120. In the implementation of the voice-enabled computer interface 100 illustrated in FIG. 1B, the voice extension module 125 is implemented as a Microsoft Internet Explorer Browser Helper Object (BHO) or as an Internet Explorer Toolbar Component. A BHO acts as an extension of functionality of the browser 155 and is used to intercept page and browser 155 events before action is taken. This allows the voice extension module 125 to define and control the behavior of the browser 155 environment and the way in which events (e.g., mouse clicks, key presses) are handled. In addition, a BHO allows the voice extension module 125 to respond to external events, such as when a word is spoken, by embedding a speech recognition engine into the BHO. In this implementation, any speech recognition engine (e.g., a SAPI-compliant speech recognition engine) may be used to generate speech recognition events. The Internet Explorer Toolbar Component provides the same functionality as the BHO. In addition, the Internet Explorer Toolbar Component may make the voice extension module 125 perceptible as a toolbar of the browser 155.

The voice extension module 125 may process data and metadata of the user interface presented with the GUI 120 or the browser 155 to identify what functions are supported by the user interface. The voice extension module 125 is configured to recognize one or more voice commands, and each of the voice commands corresponds to a semantic operation that may be performed with a user interface provided by the GUI 120 or the browser 155. A semantic operation is an operation that includes multiple smaller sub-operations, each of which may be executed with conventional interaction with the user interface, such as generating user input with a keyboard and a mouse. In other words, For example, in an implementation where the user interface includes a text field for entering a number of units of a product to be ordered, a semantic operation may include entering a number that represents the number of units of the product to be ordered. The sub-operations included in the semantic operation include identifying the text field within the user interface, selecting the text field such that the number may be entered, and actually entering the number within the text field. The user may signal for the semantic operation by issuing a single voice command, such as, for example, "Order 10 units of the product." Such a voice command does not explicitly reference the text field that is accessed during the semantic operation, nor does it explicitly reference any one of the sub-operations that comprise the semantic operation. In other words, the voice command is a shortcut for bypassing a typically large amount of navigation and data entry required to execute the multiple sub-operations included in the semantic operation. The voice extension module 125 is configured to recognize such voice commands and to signal for execution of a semantic operation corresponding to a voice command when the voice command is recognized.

The client computer system 105 and the application server 110 may be implemented using, for example, general-purpose computers capable of responding to and executing instructions in a defined manner, personal computers, special-purpose computers, workstations, servers, devices, components, or other equipment or some combination thereof capable of responding to and executing instructions. The components may receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the components.

Further, the client computer system 105 and the application server 110 include a communications interface used to send communications through the network 115. The communications may include, for example, hypertext transfer protocol (HTTP) or HTTP over Secure Socket Layer (HTTPS) GET or POST messages, e-mail messages, instant messages, audio data, video data, general binary data, or text data (e.g., encoded in American Standard Code for Information Interchange (ASCII) format).

Figure 2:
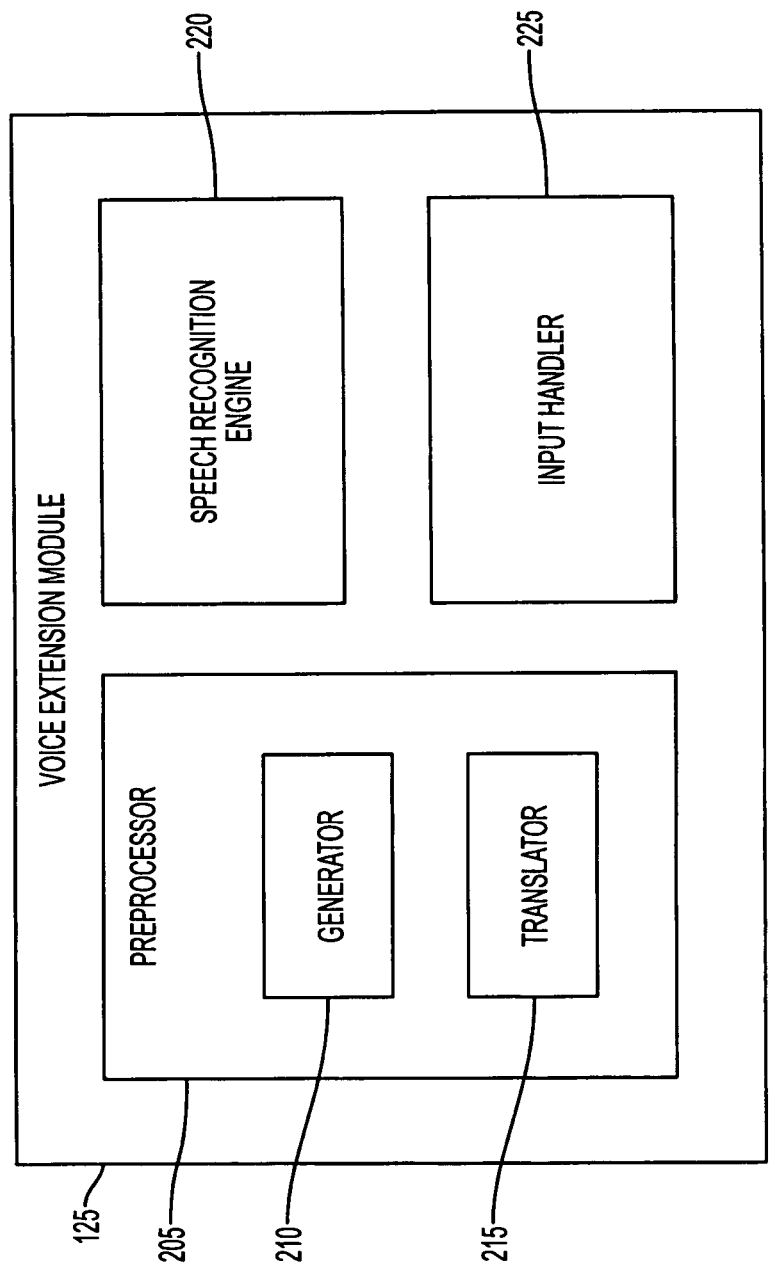
FIG. 2 is a block diagram of a voice extension module of a voice-enabled computer application.

Referring to FIG. 2, one implementation of the voice extension module 125 of FIGS. 1A and 1B includes a preprocessor 205, which includes a generator 210 and a translator 215. The voice extension module also includes a speech recognition engine 220, and an input handler 225.

The preprocessor 205 preprocesses user interface information specifying a user interface to an application to enable voice control of the user interface before the user interface is presented to a user. More particularly, the preprocessor 205 preprocesses the user interface information by using the generator 210 to identify semantic operations provided by the user interface and by using the translator 215 to identify voice commands for signaling for the execution of the semantic operations.

The generator 210 identifies semantic operations provided by the user interface. Identifying a semantic operation may include identifying sub-operations that are included in the semantic operations. The generator 210 may do so by identifying user interface elements within the code using any conventional parsing techniques. For example, user interface information in the form of an HTML web page may include various user interface elements, such as text fields, password fields, checkboxes, radio buttons, and control buttons (e.g., submit and reset). The user interface elements may be identified by traversing the document object model (DOM) of the HTML web page. Alternatively or additionally, the user interface elements may be identified using a finite state machine. Based on the identified user interface elements, the generator 210 may identify the semantic operations. For example, the user may construct the semantic operations by combining multiple operations that may be performed using one or more of the identified user interface elements.

The generator 210 also may identify the semantic operations using metadata describing the user interface and the application. For example, the generator 210 may inspect a user manual, help and support documents, or other documentation for the user interface and the application to identify the semantic operations provided by the user interface. More particularly, the user manual may include an indication of the semantic operations that are provided by the user interface in sections that generally describe the user interface. Furthermore, other sections of the user manual may identify sub-operations included in the semantic operations. As a result, the generator 210 may use the metadata to identify the semantic operations.

As an alternative to identifying the semantic operations automatically, the generator 210 may access a manual specification of the semantic operations. For example, a user may identify the semantic operations manually based on knowledge of the user interface and the application for which the user interface is presented. For example, if the application is a timekeeping application, the user may indicate that semantic operations provided by the user interface to the timekeeping application include creating time entries for particular amounts of particular types of time on particular days. The user also may indicate the sub-operations that are included in those semantic operations. Using the previous example, the user may identify modifications made to particular user interface elements to create the time entries as the sub-operations. The generator 210 may access such indications of the semantic operations and the corresponding sub-operations to identify the semantic operations.

The translator 215 identifies voice commands for signaling for the execution of the identified semantic operations. In one implementation, the translator 215 identifies at least one voice command for each of the semantic operations. The translator 215 identifies the voice commands such that each voice command corresponds to only one semantic operation. The translator 215 receives an indication of the available semantic operations from the generator 210 and identifies the corresponding voice commands. The translator 215 also registers the voice commands with the speech recognition engine 220 and the input handler 225. Registering the voice commands with the speech recognition engine 220 and the input handler 225 enables the voice commands to be handled properly when recognized.

The translator 215 may identify and register the voice commands for a semantic operation as one or more command and control grammars from which specific commands may be recognized, or as one or more context free or natural language grammars from which multiple natural language phrases may be recognized. A grammar is a specification of words and/or expected patterns of words to be listened for by the speech recognition engine 220. Using command and control grammars significantly increases the accuracy and efficiency of voice input. This is because it is much easier to recognize which of a small number of words identified in a grammar was spoken than to determine which of a very large number of possible words was spoken.

Specifying the voice commands in command and control grammars requires that the user remembers the semantic operations provided by the user interface and the voice commands from the command and control grammars that correspond to the semantic operations in order to signal for execution of the semantic operations. On the other hand, natural language grammars provide for an easier interaction by enabling natural language phrases to signal for execution of a semantic operation. Therefore, the user is not required to remember specific voice commands. Instead, the user only needs to remember the semantic operations, and the user may signal for execution of the semantic operations by issuing natural language phrases that correspond to the semantic operations. In a well defined natural language grammar, the natural language phrases that may be recognized represent voice commands that the user would naturally identify for the semantic operations. As a result, the user may signal for execution of a semantic operation without issuing a specific voice command that corresponds to the semantic operation.

The translator 215 may cause the user interface to be modified before being presented to the user, in order to make the user interface more "voice-friendly." For example, translator 215 may add identifiers to elements of the user interface. Some elements may include XML data or other metadata that indicates an appropriate identifier for the element. This metadata may determine an appropriate identifier that may be added to the element to make it more voice-friendly. Additionally, some identifiers of user interface elements may be abbreviated. One way to shorten long identifiers is to register only a portion of the long identifier. For example, if the identifier is "Submit Changes for Processing," it can be shortened to "Submit Changes" or "Submit."

The translator 215 may identify the corresponding voice commands based on the indications of the semantic operations received from the generator 210. For example, the indications of the semantic operations that are received from the generator 210 may include an indication of voice commands that are appropriate for signaling for execution of the semantic operation. Alternatively or additionally, the translator 215 may identify the voice commands through inspection of the sub-operations that are included in the semantic operations. For example, if sub-operations of one of the semantic operations include identifying a text field, accessing the text field, and entering a particular value in the text field, the translator 215 may identify "enter the value in the text field" as a voice command for the semantic operation. The voice command also may identify a more generic voice command or a grammar that enables entering any value in the text field as a voice command for the semantic operation.

Alternatively or additionally, the translator 215 may access a manual specification of the voice commands. For example, when a user manually identifies the semantic operations provided by the user interface, the user may manually indicate voice commands for signaling for the semantic operations. For example, the user may identify specific voice commands or grammars for each of the semantic operations. The translator 215 may access such indications of the voice commands to identify the voice commands.

The speech recognition engine 220 recognizes voice commands that have been previously registered by the translator 215. More particularly, when a user of the user interface speaks, the speech recognition engine 220 parses the speech to identify one of the registered voice commands. The speech recognition engine 210 may use a grammar identified by the translator 215 to enhance its ability to recognize specific combinations of spoken words and phrases as previously registered voice commands. When a voice command is recognized, the speech recognition engine 220 generates an indication of the recognized voice command. The indication of the recognized voice command is passed to the input hander 225. In one implementation, the speech recognition engine 210 is ViaVoice provided by International Business Machines of Armonk, N.Y. In another implementation, the speech recognition engine 210 is the Speech Recognition Engine provided by Microsoft Corporation of Redmond, Wash.

The input handler 225 maintains a mapping of voice commands to semantic operations to be executed in response to the voice commands. The translator 215 registers the voice commands and the corresponding semantic operations with the input handler such that a semantic operation corresponding to a recognized voice command may be executed. When an indication of a recognized voice command is received, the input handler 225 identifies the voice command that has been recognized. The input handler 225 uses the mapping to identify the semantic operation corresponding to the recognized voice command, and signals for execution of the identified semantic operation with the user interface. Prior to doing so, the input handler 225 may save information describing a current state of the user interface, such that, for example, the semantic operation may be undone. The input handler 225 also may signal for the execution of any additional tasks, as defined by the behavior of the user interface or visual focusing used in the overall user interface strategy. The input handler 225 helps to ensure that consistent action is taken regardless of whether the semantic operation is executed with a mouse or a keyboard, or in response to an equivalent voice command.

Figure 3:
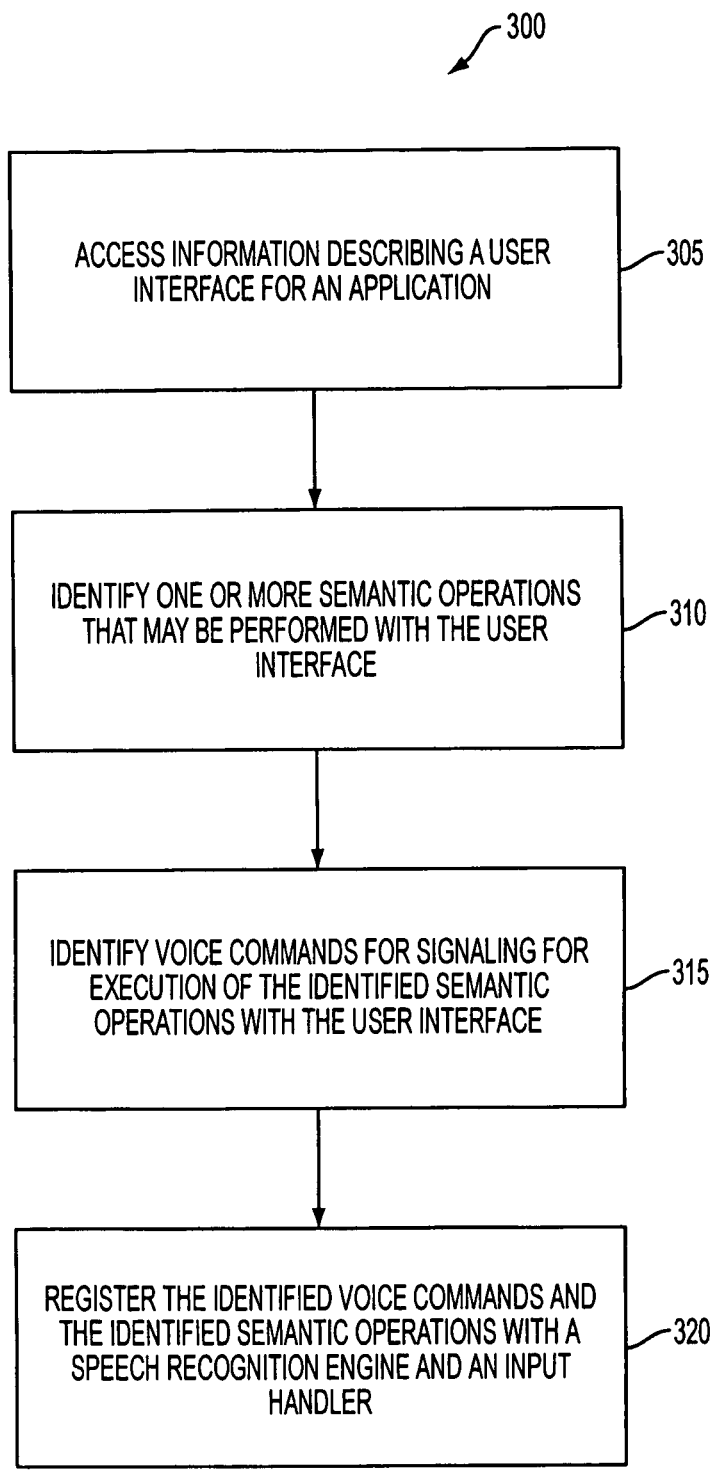
FIG. 3 is a flow chart of a process for registering voice commands that may be used to control a voice-enabled computer application.

Referring to FIG. 3, a process 300 is used to voice-enable a user interface. More particularly, the process 300 is used to register one or more voice commands for signaling for execution of a semantic operation provided by the user interface. The user interface may be the graphical user interface 120 of FIG. 1A or a user interface presented in the browser 155 of FIG. 1B. The process 300 is executed by a voice extension module, such as the voice extension module 125 of FIGS. 1A, 1B, and 2. More particularly, the process 300 is executed by a preprocessor of the voice extension module, such as the preprocessor 205 of FIG. 2.

The preprocessor first accesses information describing a user interface for an application (305). More particularly, a generator of the preprocessor, such as the generator 210 of FIG. 2, accesses the information. For example, the generator may access information specifying a user interface that is received from an application server on which the application is executing, such as the application server 110 of FIG. 1. Alternatively, the generator may access the information from a standalone graphical user interface for the application, such as the graphical user interface 120 of FIG. 1. The information describing the user interface may identify one or more user interface elements that are included in the user interface. For example, the information may be an HTML document identifying various user interface elements that may be controlled by a user. The information also may include JavaScript code or any other control mechanism conventionally used by web browsers. Alternatively or additionally, the information may include metadata that describes the user interface and functions provided by the user interface.

The preprocessor identifies one or more semantic operations that may be performed with the user interface (310).

More particularly, the generator identifies the semantic operations. In addition to identifying the semantic operations provided by the user interface, the generator also identifies sub-operations of the identified semantic operations that are executed in order to execute the identified semantic operations. The generator may identify the semantic operations by identifying the user interface elements and then constructing the semantic operations from multiple operations that that may be performed using one or more of the user interface elements. When the information describing the user interface 110 includes metadata, the metadata may be used to identify the semantic operations and the sub-operations included in the semantic operations. The generator also may identify the semantic operations and the sub-operations based on a manual specification of the semantic operations and the sub-operations.

The preprocessor identifies voice commands for signaling for execution of the identified semantic operations with the user interface (315). More particularly, a translator of the preprocessor, such as the translator 215 of FIG. 2, identifies the voice commands. The generator passes the translator indications of the identified semantic operations and corresponding sub-operations, and the translator identifies at least one voice command for each of the identified semantic operations. The voice commands may be identified such that each voice command corresponds to at most one semantic operation. The indications of the semantic operations provided by the generator may include indications of the voice commands for the semantic operations that may be identified by the translator. For example, a name by which the generator identifies a semantic operation to the translator may be identified as a voice command for the semantic operation. The translator also may inspect the sub-operations corresponding to a semantic operation to identify voice commands for the semantic operation. Alternatively or additionally, the translator may identify the voice commands for the identified semantic operations from a manual specification of the voice commands.

The preprocessor registers the identified voice commands, the identified semantic operations, and the corresponding sub-operations with a speech recognition engine and an input handler (320). More particularly, the translator registers the identified voice commands with a speech recognition engine, such as the speech recognition engine 220 of FIG. 2. Registering the voice commands with the speech recognition engine enables the voice commands to be recognized such that the corresponding semantic operations may be executed. In addition, the translator registers the voice commands, the semantic operations, and the corresponding sub-operations with an input handler, such as the input handler 225 of FIG. 2. Registering the voice commands, the semantic operations, and the sub-operations with the input handler may include enabling the input handler to identify and to signal for execution of sub-operations of a semantic operation for which a corresponding voice command was recognized. Once the identified voice commands have been registered, the user interface may be displayed.

Figure 4:
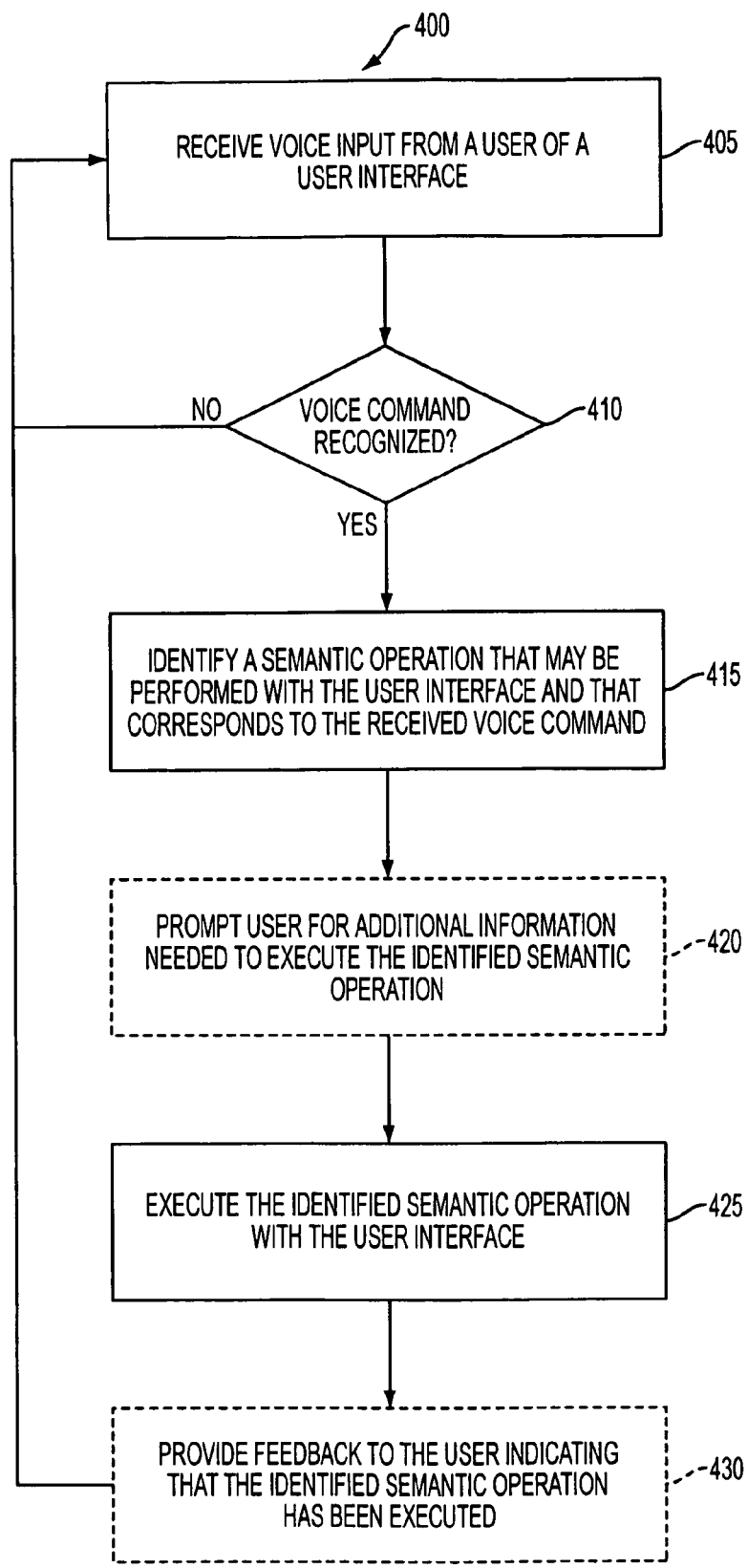
FIG. 4 is a flow chart of a process for controlling a voice-enabled computer application in response to a voice command.

Referring to FIG. 4, a process 400 is used to control a voice-enabled user interface in response to voice input from a user. The user interface may be the graphical user interface 120 of FIG. 1A, or a user interface presented in the browser 155 of FIG. 1B. The user interface may have been voice-enabled as a result of the execution of the process 300 of FIG. 3. The process 400 is executed by a voice extension module, such as the voice extension module 125 of FIGS. 1A, 1B, and 2. More particularly, the process 300 is executed by a speech recognition engine and an input handler of the voice extension module, such as the speech recognition engine 220 and the input handler 225 of FIG. 2.

The process begins when the voice extension module receives voice input from a user of the user interface (405). The user may generate the voice input by speaking into a microphone of a client computer system on which the user interface is displayed, such as the microphone 150 of the client computer system 105 of FIGS. 1A and 1B. The client computer system provides the voice input received from the microphone to the voice extension module, which provides the voice input to the speech recognition engine.

The speech recognition engine determines whether the voice input is recognized as a voice command for a semantic operation (410). In other words, the speech recognition engine parses the voice input to determine whether a portion of the voice input represents a voice command that was registered with the speech recognition engine during the process 300 of FIG. 3 that was used to voice-enable the user interface.

If a voice command is recognized from the voice input, then the speech recognition engine passes an indication of the recognized voice command to the input handler. The input handler identifies a semantic operation that may be performed with the user interface that corresponds to the received voice command (415). The semantic operation may be identified from a mapping of voice commands to semantic operations that is maintained by the input handler.

The input handler may prompt the user for additional information needed to execute the identified semantic operation (420). For example, the recognized voice command may sufficiently identify a semantic operation, but the recognized voice command may not adequately specify the semantic operation such that the semantic operation may be executed. For example, the recognized voice command may not include values for parameters needed to execute the semantic operation. In order to fully specify the identified semantic operation, the input handler may prompt the user for additional voice input that includes other information necessary for specifying the semantic operation. In response to the prompt, the user provides the requested voice input in the same manner as voice input was previously provided. The speech recognition engine may recognize the necessary information from the requested voice input and may pass the recognized information to the input handler. As a result, the input handler has information that fully specifies the identified semantic operation. Such interaction in which the user is prompted for additional information may be referred to as a mixed-initiative interaction.

The input handler executes the identified semantic operation with the user interface (425). The input handler may maintain an indication of sub-operations that correspond to the identified semantic operation, and the input handler may signal for the execution of each of the sub-operations included in the identified semantic operation. The input handler may use the information requested from the user when signaling for the execution of the sub-operations. Prior to executing the sub-operations, a current state of the user interface may be recorded such that, for example, the semantic operation may be undone.

The input handler also may provide feedback indicating that the identified semantic operation has been executed to the user (430). In one implementation, the input handler may signal for one or more user interface elements that were modified as a result of executing the identified semantic operation to be highlighted with, for example, a colored border or another visual identifier. In another implementation, the input handler may signal for an audio message indicating that the semantic operation has been executed to be presented to the user with a speaker of the client computer system, such as the speaker 145 of FIGS. 1A and 1B. The audio message may identify and describe the semantic operation that has been executed. The audio message may be a pre-recorded sound or audio generated by a text-to-speech (TTS) system.

After the semantic operation has been executed (430), or if a voice command was not recognized from the input received from the user (410), the voice extension module listens for additional voice input from the user such that additional semantic operations may be executed. In this manner, the voice extension module enables voice commands to be processed at any time another voice command is not being processed, such that the user may issue repeated voice commands to interact with the user interface.

Figure 5:
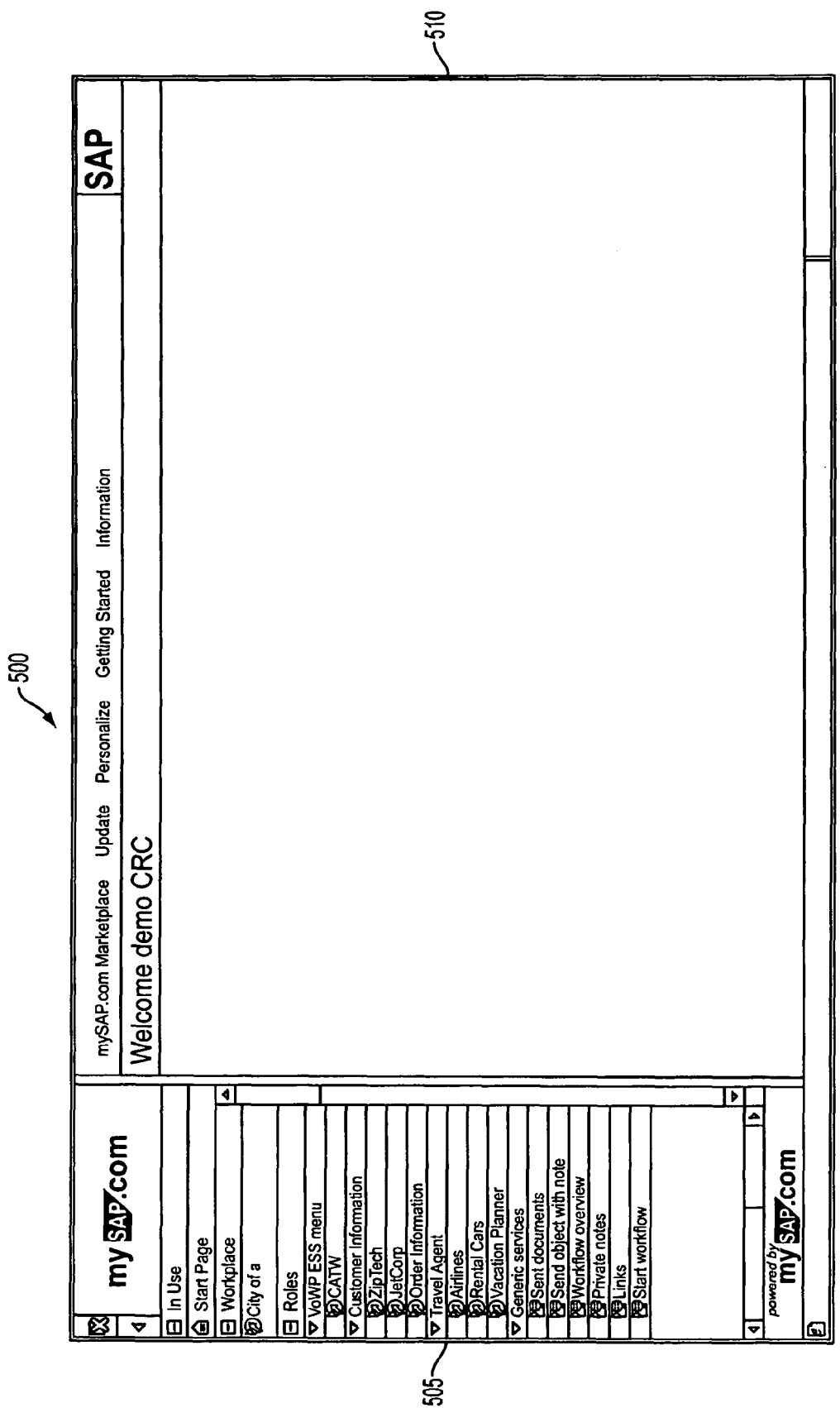
FIGS. 5-8 are screen shots of a user interface for a voice-enabled computer application.
Figure 6:
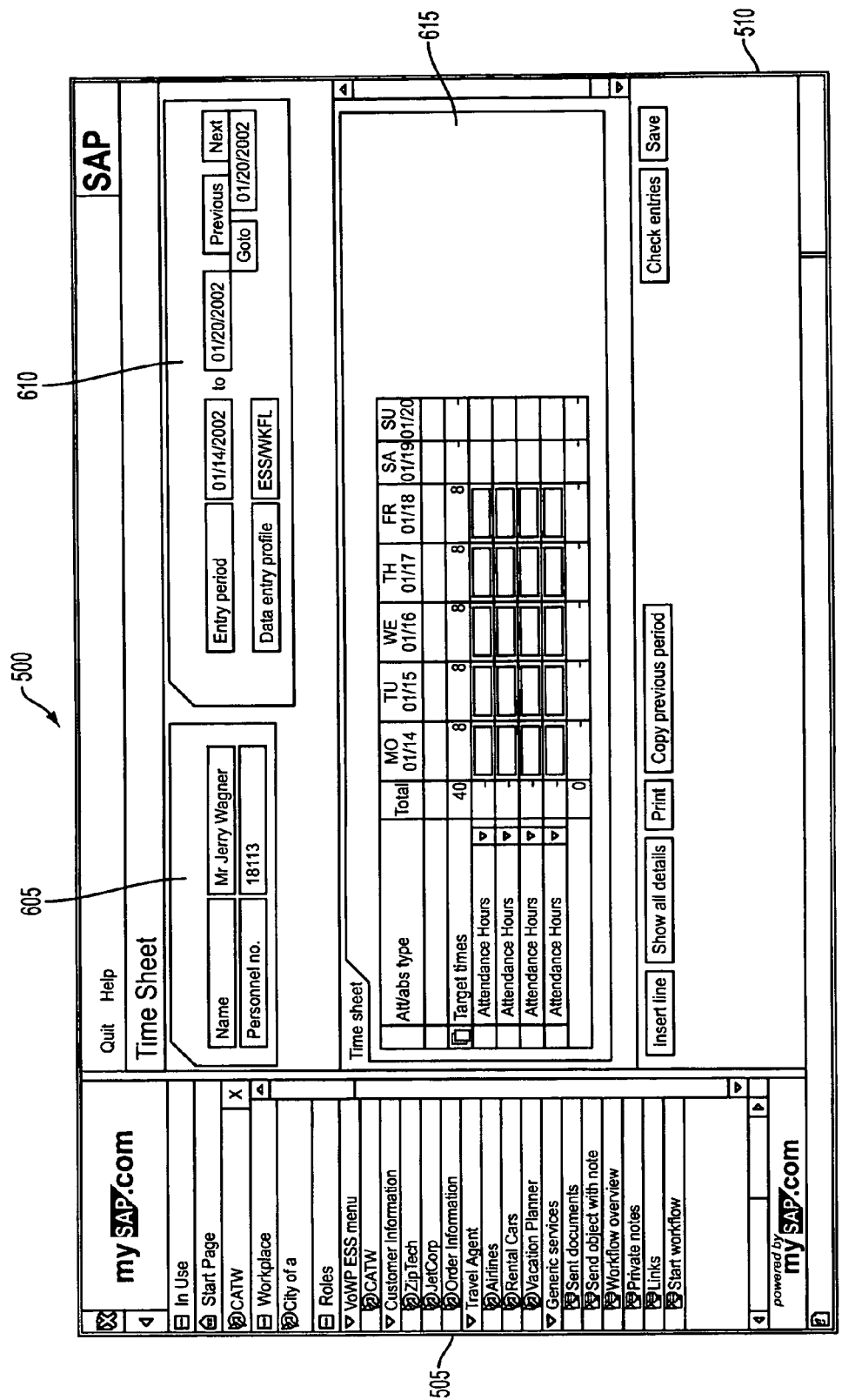

FIGS. 5-8 describe a voice-enabled electronic timekeeping application in which single voice commands may be issued to signal for the execution of semantic operations that include multiple sub-operations. Referring to FIG. 5, a web portal allows a user to select various applications. The application window 500 includes two screen areas: a menu area 505 listing the various applications and a display area 510. The menu 505 is subdivided into several areas including a "Roles" area allowing a user to select tasks based on several indicated roles. The application begins with the focus area set to the "Roles" menu. The focus area may be indicated by a visual cue such as, for example, a colored line surrounding the focus area. The user may select to begin the electronic timekeeping application (named "CATW") by speaking "CATW." This command initiates the application using display area 510 as shown in FIG. 6.

Referring to FIG. 6, the electronic timekeeping application includes three general components that are displayed in display area 510. These components include the following: a user identification component 605, a time period component 610, and a time entry component 615. The user identification component 605 lists the user's name and personnel number. The time period component 610 lists the displayed time period and allows the user to switch to other time periods. The time entry component 615 allows a user to modify and/or enter time for the time period indicated by the time period component 610. The visual cue is moved to the display area 510 indicating that this area now has priority for command interpretation.

The time entry component 615 includes what looks like a spreadsheet with columns indicating the days in the time period and rows indicating various categories of time entry, such as, for example, annual leave, attendance hours, business trip, compensation flex time, compensation overtime, education/training, family medical leave, holiday, jury duty, long term disability, meeting, personal time, severance pay, or short term disability. Various text fields corresponding to each row/column combination are available for data entry.

Figure 7:
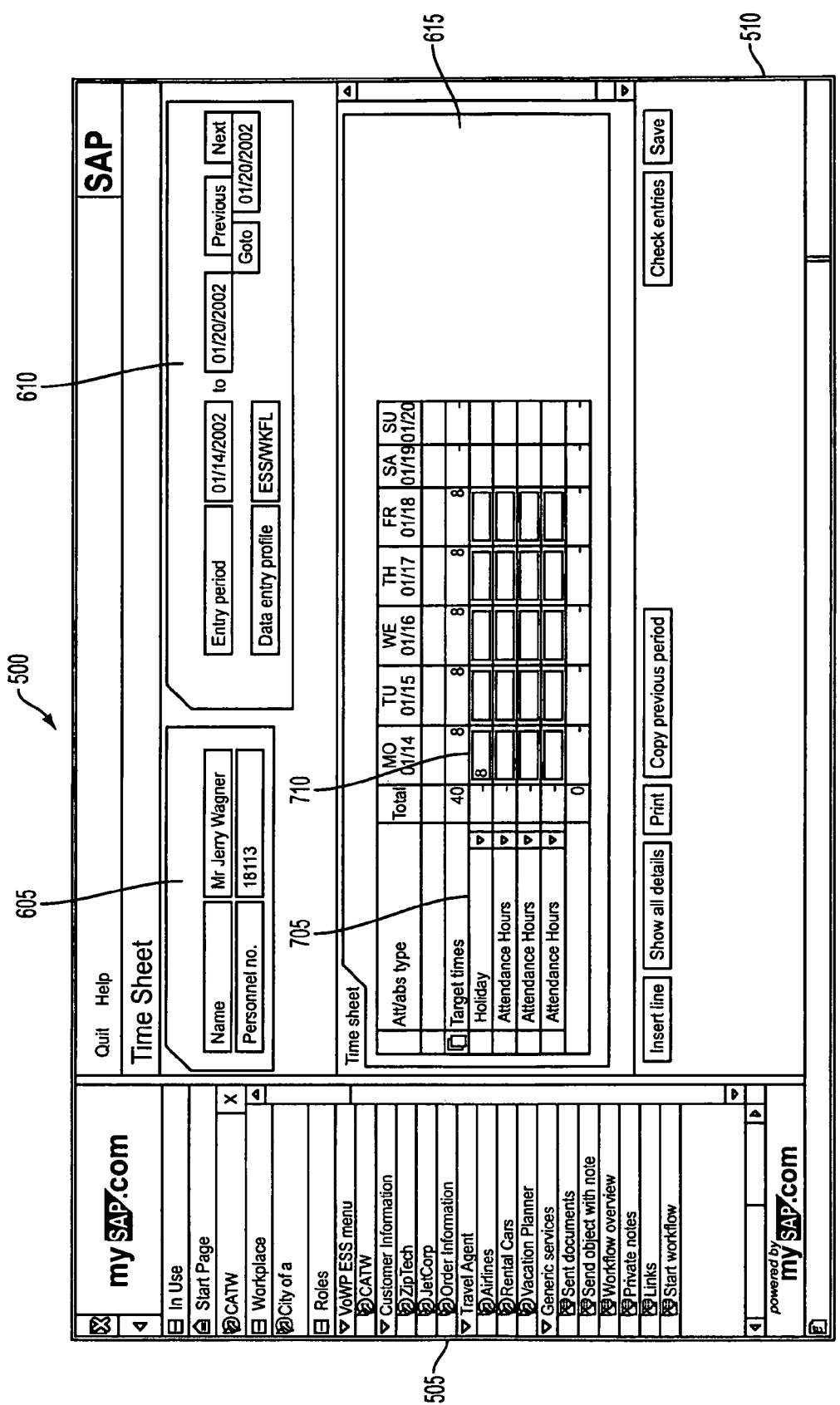

Referring to FIG. 7, a user may desire to enter 8 hours of holiday time for the first day of the time period displayed in the time entry component 615. Such an operation is a semantic operation because the operation involves the sub-operations of entering the amount of time in a text field corresponding to the first day and specifying that the time is holiday time with a selection list associated with the text field. The user may say "enter 8 hours of holiday time for the first day," or another similar command that has been registered previously as corresponding to the semantic operation, to signal for execution of the semantic operation. In response to the command from the user, "holiday" is selected from the selection list 705, and "8" is entered into the text field 705. In other words, the entire semantic operation was executed in response to the single voice command issued by the user.

In some implementations, visual feedback may be provided to the user to indicate that the semantic operation has been executed. For example, as illustrated, the selection list 705 and the text field 710 have been outlined to draw the user's attention to the fact that the selection list 705 and the text field 710 have been modified as a result of the execution of the semantic operation. In typical implementations, the visual feedback provided to the user is associated positionally with elements of the user interface that are modified in response to the voice command. In some implementations, the visual feedback that is provided to a user may depend on the semantic operation that has been executed. For example, if the selection list 705 and the text field 710 may be modified as a result of the execution of two distinct semantic operations, the selection list 705 and the text field 710 may be outlined with a first color when modified as a result of the first semantic operation and with a second color when modified as a result of the second semantic operation. As a result, the visual feedback identifies the semantic operation that was executed. In addition, an audio message indicating that the semantic operation has been executed may be presented to the user.

In some implementations, the user may provide an ambiguous, unclear, or incomplete voice command for the semantic operation. In other words, the voice command may correspond to zero or more than one semantic operations. In such implementations, the user may be prompted to provide additional information such that the ambiguity may be resolved, or such that the voice command may be clarified or completed. For example, the user simply may say "Enter 8 hours for the first day." Such a voice command does not identify a type of time to be entered for the first day. As a result, the user may be prompted to specify a type for the time to be entered for the first day, and the user may say or otherwise indicate that the time is holiday time. As another example, the user may say "enter 8 hours of holiday time," which does not identify a day on which the holiday time is to be entered. The user may be prompted to specify a day on which the holiday time is to be entered, and the user may say or otherwise indicate that the time is to be entered on the first day. Once the clarification is received from the user, the semantic operation corresponding to the clarified voice command may be executed. More particularly, the selection list 705 and the text field 710 may be modified to indicate that 8 hours of holiday time has been entered for Monday. Visual and audio feedback may be provided to indicate that the semantic operation has been executed.

Figure 8:
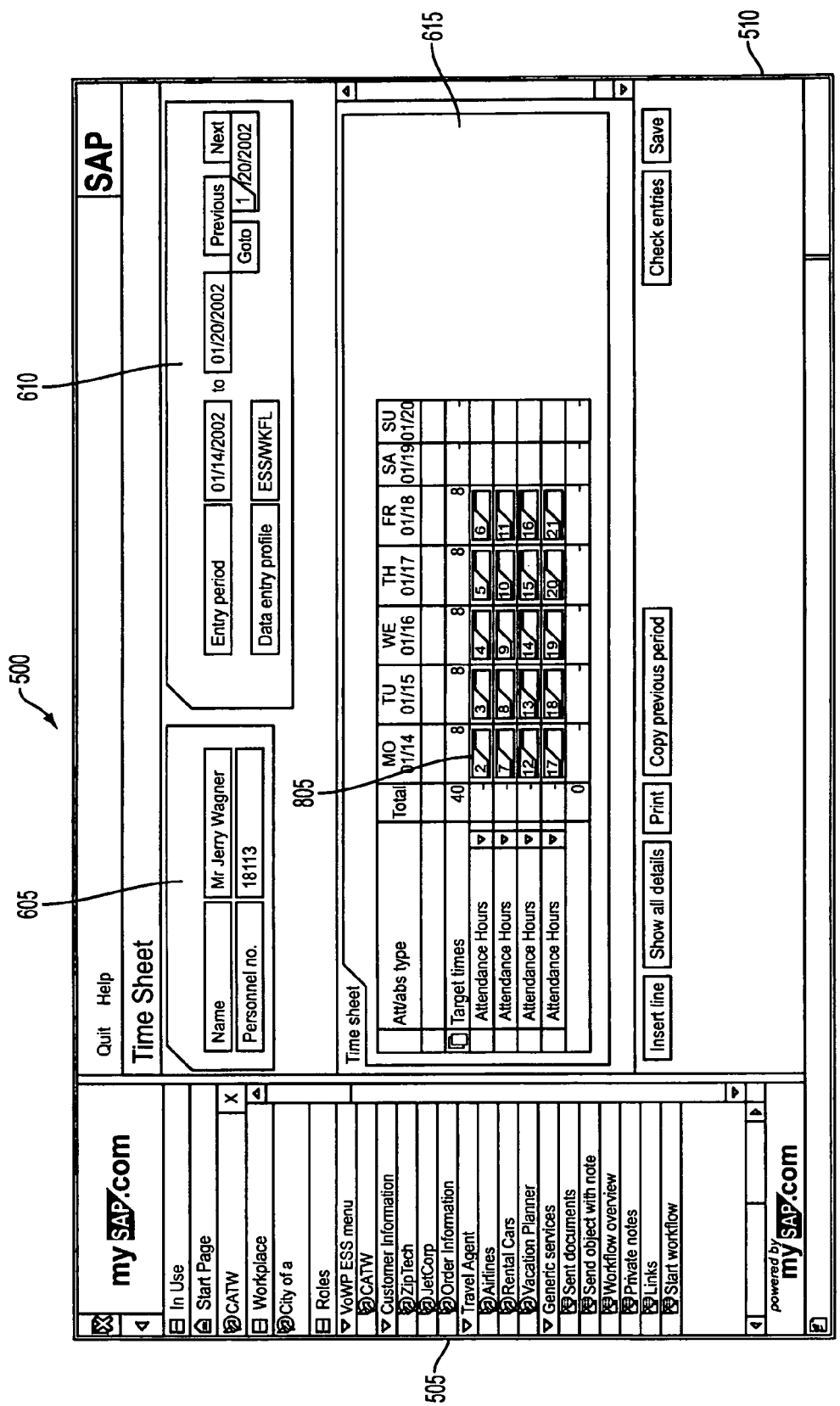

Referring to FIG. 8, visual cues and labels may be used within the time entry component 615 to enable disambiguation and clarification of voice commands. For example, the user may say "enter 8 hours of holiday time," which does not identify a day on which the holiday time is to be entered. The user may be prompted to identify a text field in which the amount of the holiday time may be entered. Each of the possible text fields into which the amount may be entered is indicated by a representational enumerated label, such as a representational enumerated label 805 that identifies the upper leftmost text field of the time entry component 615. Each of the representational enumerated labels includes an identifier, such as a number, by which the corresponding text field may be identified. Label "1" is placed in the text field in the time period component 605. The remaining labels "2-21" are placed in the text fields of the time entry component 615. The user may identify the text field into which the amount of time is to be entered by the identifier of the corresponding label. The representational enumerated labels may be semi-transparent overlays placed over the corresponding user interface elements. Using semi-transparent overlays enables the identification of one of the text fields without substantially affecting the appearance of the text fields such that the user may view the text fields through the semi-transparent overlays.

Selecting one of the text fields automatically identifies a corresponding selection list in which a type of the entered time may be entered. More particularly, a selection list directly to the left of the identified text field will be used to specify that the entered time is holiday time. As a result, selecting one of the text fields clarifies the voice command initially received from the user. The semantic operation corresponding to the clarified voice command may be executed. More particularly, the representational enumerated labels may be cleared from the display area 510, and the selection list 705 and the text field 710 may be modified to indicate that 8 hours of holiday time has been entered for the first day, as illustrated in FIG. 7. Visual and audio feedback may be provided to indicate that the semantic operation has been executed, as illustrated in FIG. 7.

FIGS. 5-8 illustrate a voice interface for an electronic timekeeping system with which single voice commands may be issued to signal for the execution of semantic operations that include multiple sub-operations. The described techniques may be used to provide voice control in any graphical user interface.

Figure 9:
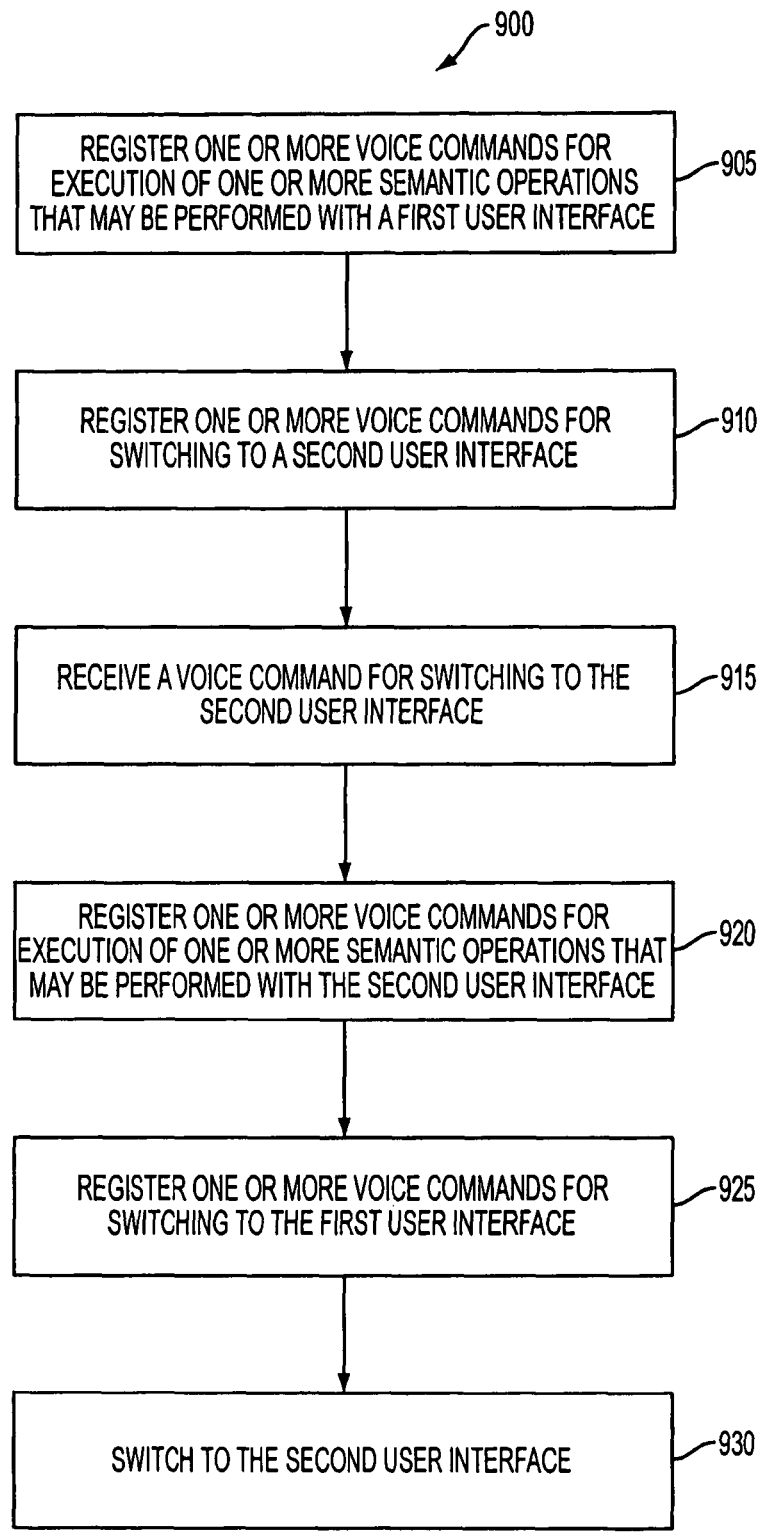
FIG. 9 is a flow chart of a process for switching between voice-enabled computer applications.

Referring to FIG. 9, a process 900 is used to enable a user to signal for a switch between user interfaces for multiple applications such that semantic operations provided by each of the multiple applications may be executed in response to voice commands from the user. For example, the web portal illustrated in FIGS. 5-8 enables a user to switch between user interfaces provided by multiple applications. The process 900 is executed by a voice extension module, such as the voice extension module 125 of FIGS. 1A, 1B, and 2. In some implementations, the voice extension module that executes the process 900 may be shared among the user interfaces of the multiple applications.

The process 900 begins when the voice extension module registers one or more voice commands for execution of one or more semantic operations that may be performed with a first user interface (905). The voice commands may be registered by executing the process 300 of FIG. 3 for the first user interface. The voice commands enable the user to signal for the execution of semantic operations provided by the first user interface.

In addition, the voice extension module registers one or more voice commands for switching to a second user interface (910). Such voice commands may be registered in a manner similar to the voice commands for the semantic operations of the first user interface. More particularly, switching from the first user interface to the second user interface may be identified as a semantic operation that may be performed with the first user interface. As a result, voice commands for such a switch may be registered according to the process 300. Registering those voice commands enables the user to switch to the second user interface in case the user needs to execute one or more semantic operations provided by the second user interface.

In some implementations, voice commands for execution of one or more semantic operations that may be performed with the second user interface are registered in addition to the voice commands for switching to the second user interface. In addition, voice commands that signal for both a switch to the second user interface and for execution of a semantic operation provided by the second user interface may be registered. Such voice commands may be registered by executing the process 300.

The voice extension module receives a voice command for switching to the second user interface (915). The voice command may be identified according to the process 400 of FIG. 4. The voice command may signal only for a switch to the second user interface, or for a switch to the second user interface and for execution of a semantic operation provided by the second user interface.

Prior to executing the switch from the first user interface to the second user interface, the voice extension module may prevent previously registered voice commands from being recognized further, because those voice commands may not be needed once the switch to the second user interface is made. The voice extension module also registers one or more voice commands for execution of one or more semantic operations that may be performed with the second user interface, if such commands have not been registered already (920). The voice commands may be registered by executing the process 300 for the second user interface. The voice commands enable the user to signal for the execution of semantic operations provided by the second user interface once a switch to the second user interface is made.

The voice extension module also registers one or more voice commands for switching to the first user interface (925). Such voice commands may be registered in a manner similar to the voice commands for the semantic operations of the second user interface. More particularly, switching from the second user interface to the first user interface may be identified as a semantic operation that may be performed with the second user interface. As a result, voice commands for such a switch may be registered according to the process 300.

In some implementations, voice commands for execution of one or more semantic operations that may be performed with a first user interface may be registered in addition to the voice commands for switching to the first user interface, if such voice commands are not already registered. In addition, voice commands that signal for both a switch to the first user interface and for execution of a semantic operation provided by the first user interface may be registered. Such voice commands may be registered by executing the process 300 of FIG. 3.

After the commands are registered, a switch is made to the second user interface (930). The switch is made in response to the voice command received from the user (915). Before switching to the second user interface, the user may be prompted to save a current state of the first interface such that the current state may be restored the next time the first user interface is accessed. Depending on the voice command that was received from the user, a semantic operation provided by the second user interface may be executed in addition to the switch to the second user interface. Once the switch has been completed, the user may issue further voice commands to signal for execution of the semantic operations provided by the second user interface, or to signal for a switch back to the first user interface.

In one implementation, the first user interface is a user interface to an electronic timekeeping application, and the second user interface is a user interface to an application for generating leave requests. Voice commands for signaling for execution of a semantic operation provided by the electronic timekeeping application and voice commands for signaling for a switch to the leave request application are registered (905, 910). While creating a time entry for vacation time with the electronic timekeeping application, a user may realize that a leave request for the vacation time must be submitted. As a result, the user may issue a voice command for switching to the user interface for the leave request application such that the leave request may be generated (915). In response, voice commands for signaling for execution of a semantic operation provided by the leave request application and voice commands for signaling for a switch to the electronic timekeeping application are registered (920, 925). A switch is made to the user interface for the leave request application (930), and the user may issue voice commands for generating the leave request. After the leave request has been generated, the user may issue a voice command to signal for a switch back to the electronic timekeeping application. Alternatively or additionally, the user may continue to use the leave request application.

The implementation of the process 900 illustrated in FIG. 9 enables a user to signal for a switch between two user interfaces for two applications such that semantic operations provided by each of the two applications may be executed in response to voice commands from the user. Other implementations of the process 900 may enable a user to signal for a switch between any number of user interfaces for any number of applications such that semantic operations provided by each of the applications may be executed in response to voice commands from the user.

The process 900 is used to register voice commands for switching between, and for signaling for execution of semantic operations provided by, multiple user interfaces. In the illustrated implementation of the process 900, the commands for switching from, or for signaling for execution of a semantic operation provided by, a user interface are registered when a switch to the user interface is to be made. In other implementations, commands for switching between, and for signaling for execution of semantic operations provided by, all of the multiple user interfaces may be registered before any of the multiple user interfaces are used. Therefore, when a voice command for switching to a different user interface is received, the switch may be made without first registering additional voice commands corresponding to the different user interface. However, in such implementations, a switch to a user interface is performed before any semantic operations provided by the user interface may be executed in response to a corresponding voice command.

The techniques for voice-enabling user interfaces are described above in the context of a standalone graphical user interface and a web-based user interface presented in a web browser. More particularly, the techniques are described in the context of a client-server architecture in which a user interface is separated from an application corresponding to the user interface. Such an architecture enables or requires the user interface to be voice-enabled without modifying the application, because the user interface is not a component of the application. However, the described techniques may be applied in other architectures in which an application and a corresponding user interface are not separated. In such architectures, voice-enabling the user interface may require modification of the application.

Semantic operations provided by a user interface are described throughout as being performed in response to voice commands from a user of the user interface. However, other operations provided by the user interface may be performed in response to voice commands from the user. For example, individual graphical elements of the user interface, such as a text field, a selection list, a scroll bar, a slider, a radio button, a checkbox, an icon, or a button may be controlled in response to voice commands from the user. The user interface elements may be selected or activated in response to a voice command. In addition, the user interface elements may be modified in response to a voice command. For example, in response to a voice command, data may be entered into a text field, an option provided by a selection list may be selected, or a position of a scroll bar or a slider may be changed.

Voice commands for controlling the user interface elements are registered with a speech recognition engine and an input handler of a voice recognition module corresponding to the user interface to enable the voice commands to be recognized. The voice commands may be identified by parsing information specifying the user interface to identify the user interface elements, and then by identifying voice commands for controlling the identified user interface elements.

The voice commands described throughout as being used to signal for execution of a semantic operation provided by a user interface, or to control a graphical element of the user interface, may be representative of multiple languages. For example, a voice extension module that voice-enables the user interface may register one ore more voice commands for signaling for execution of a semantic operation provided by the user interface that are representative of multiple languages such that one of the multiple languages may be used to signal for execution of the semantic operation. More particularly, voice commands that are representative of multiple languages may be used to signal for execution of semantic operations provided by a user interface as described in related U.S. patent application Ser. No. 11/017,889, referenced above.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for enabling a user interface to be controlled with voice commands, the method comprising:
    receiving information specifying a first user interface at a client computer system, the first user interface enabling interaction with an existing application executed on an application server and being a standalone interface that is separate from the existing application;
    constructing one or more semantic operations by processing the information specifying the first user interface on the client computer system, each of the one or more semantic operations including sub-operations that are executable using user interface elements of the first user interface, the sub-operations comprising identifying a user interface element, selecting the user interface element, and inputting data using the user interface element;
    registering one or more voice commands to enable voice control of the first user interface and for initiating execution of the one or more semantic operations, each voice command corresponding to one of the semantic operations, the application executed on the application server remaining unmodified in view of the constructing one or more semantic operations and the registering one or more voice commands;
    displaying the first user interface at the client computer system upon registering the one or more voice commands; and
    performing one of the semantic operations in response to a first voice command, the first voice command not explicitly referencing the user interface element, wherein performing one of the semantic operations includes automatic execution of each of the sub-operations in response to the first voice command.

2. The method of claim 1 further comprising:
    registering one or more additional voice commands to enable switching to a second user interface of a second application, each additional voice command corresponding to a switch to the second user interface; and
    performing, in response to a second voice command that is one of the additional voice commands and that corresponds to a switch to the second application, the switch to the second user interface corresponding to the second voice command.

3. The method of claim 1 further comprising:
    registering one or more additional voice commands to enable voice control of a second user interface, each additional voice command corresponding to a semantic operation that may be performed with the second user interface; and
    performing one of the semantic operations in response to a second voice command, the second voice command being one of the additional voice commands, the performed semantic operation corresponding to the second voice command.

4. The method of claim 1 further comprising:
    identifying one or more graphical elements of the first user interface that may be controlled;
    registering one or more additional voice commands to enable control of the identified graphical elements of the first user interface, each additional voice command corresponding to at least one of the identified graphical elements; and
    controlling one of the identified graphical elements in response to a second voice command, the second voice command being one of the additional voice commands, the controlled graphical element corresponding to the second voice command.

5. The method of claim 1 further comprising prompting for additional information that further specifies the semantic operation that is performed in response to the first voice command.

6. The method of claim 1 further comprising providing feedback indicating that the semantic operation indicated by the first voice command has been performed.

7. The method of claim 1, wherein the information comprises one or more of a hypertext markup language (HTML) document that identifies user interface elements, a control mechanism implemented by a web browser, and metadata that describes the first user interface and functions provided by the first user interface.

8. The method of claim 1, wherein the first user interface is at least one from a group including a hypertext markup language (HTML) document presented in a web browser, a standalone application, and a user interface for a web services application.

9. A computer storage medium encoded with a computer program, the program comprising instructions that when executed by data processing apparatus cause the data processing apparatus to perform operations comprising:
    receiving information specifying a first user interface at a client computer system, the first user interface enabling interaction with an existing application executed on an application server and being a standalone interface that is separate from the existing application;
    constructing one or more semantic operations by processing the information specifying the first user interface on the client computer system, each of the one or more semantic operations including sub-operations that are executable using user interface elements of the first user interface, the sub-operations comprising identifying a user interface element, selecting the user interface element, and inputting data using the user interface element;
    registering one or more voice commands to enable voice control of the first user interface and for initiating execution of the one or more semantic operations, each voice command corresponding to one of the semantic operations, the application executed on the application server remaining unmodified in view of the constructing one or more semantic operations and the registering one or more voice commands;
    displaying the first user interface at the client computer system upon registering the one or more voice commands; and
    performing one of the semantic operations in response to a first voice command, the first voice command not explicitly referencing the user interface element, wherein performing one of the semantic operations includes automatic execution of each of the sub-operations in response to the first voice command.

10. The computer storage medium of claim 9, wherein the operations further comprise:
    registering one or more additional voice commands to enable switching to a second user interface of a second application, each additional voice command corresponding to a switch to the second user interface; and
    performing, in response to a second voice command that is one of the additional voice commands and that corresponds to a switch to the second application, the switch to the second user interface corresponding to the second voice command.

11. The computer storage medium of claim 9, wherein the operations further comprise:
registering one or more additional voice commands to enable voice control of a second user interface, each additional voice command corresponding to a semantic operation that may be performed with the second user interface; and
performing one of the semantic operations in response to a second voice command, the second voice command being one of the additional voice commands, the performed semantic operation corresponding to the second voice command.

12. The computer storage medium of claim 9, wherein the operations further comprise:
identifying one or more graphical elements of the first user interface that may be controlled;
registering one or more additional voice commands to enable control of the identified graphical elements of the first user interface, each additional voice command corresponding to at least one of the identified graphical elements; and
controlling one of the identified graphical elements in response to a second voice command, the second voice command being one of the additional voice commands, the controlled graphical element corresponding to the second voice command.

13. The computer storage medium of claim 9, wherein the operations further comprise prompting for additional information that further specifies the semantic operation that is performed in response to the first voice command.

14. The computer storage medium of claim 9, wherein the operations further comprise providing feedback indicating that the semantic operation indicated by the first voice command has been performed.

15. The computer storage medium of claim 9, wherein the information comprises one or more of a hypertext markup language (HTML) document that identifies user interface elements, a control mechanism implemented by a web browser, and metadata that describes the first user interface and functions provided by the first user interface.

16. The computer storage medium of claim 9, wherein the first user interface is at least one from a group including a hypertext markup language (HTML) document presented in a web browser, a standalone application, and a user interface for a web services application.

17. A system, comprising:
a display; and
a computer storage medium encoded with a computer program, the program comprising instructions that when executed by data processing apparatus cause the data processing apparatus to perform operations comprising:
receiving information specifying a first user interface at a client computer system, the first user interface enabling interaction with an existing application executed on an application server and being a standalone interface that is separate from the existing application;
constructing one or more semantic operations by processing the information specifying the first user interface on the client computer system, each of the one or more semantic operations including sub-operations that are executable using user interface elements of the first user interface, the sub-operations comprising identifying a user interface element, selecting the user interface element, and inputting data using the user interface element;
registering one or more voice commands to enable voice control of the first user interface and for initiating execution of the one or more semantic operations, each voice command corresponding to one of the semantic operations, the application executed on the application server remaining unmodified in view of the constructing one or more semantic operations and the registering one or more voice commands;
displaying the first user interface at the client computer system upon registering the one or more voice commands; and
performing one of the semantic operations in response to a first voice command, the first voice command not explicitly referencing the user interface element, wherein performing one of the semantic operations includes automatic execution of each of the sub-operations in response to the first voice command.

18. The system of claim 17, wherein the operations further comprise:
registering one or more additional voice commands to enable switching to a second user interface of a second application, each additional voice command corresponding to a switch to the second user interface; and
performing, in response to a second voice command that is one of the additional voice commands and that corresponds to a switch to the second application, the switch to the second user interface corresponding to the second voice command.

19. The system of claim 17, wherein the operations further comprise:
registering one or more additional voice commands to enable voice control of a second user interface, each additional voice command corresponding to a semantic operation that may be performed with the second user interface; and
performing one of the semantic operations in response to a second voice command, the second voice command being one of the additional voice commands, the performed semantic operation corresponding to the second voice command.

20. The system of claim 17, wherein the operations further comprise:
identifying one or more graphical elements of the first user interface that may be controlled;
registering one or more additional voice commands to enable control of the identified graphical elements of the first user interface, each additional voice command corresponding to at least one of the identified graphical elements; and
controlling one of the identified graphical elements in response to a second voice command, the second voice command being one of the additional voice commands, the controlled graphical element corresponding to the second voice command.

\* \* \* \* \*